United States Patent
Moschini et al.

(10) Patent No.: US 11,087,535 B2
(45) Date of Patent: Aug. 10, 2021

(54) REBUILDING THREE-DIMENSIONAL MODELS TO PROVIDE SIMPLIFIED THREE-DIMENSIONAL MODELS

(71) Applicant: Hewlett-Packard Development Company, L.P., Spring, TX (US)

(72) Inventors: Alexandre Pedroso Moschini, Porto Alegre (BR); Cleobulo Sales Neto, Porto Alegre (BR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/334,447

(22) PCT Filed: Oct. 14, 2016

(86) PCT No.: PCT/US2016/057122
§ 371 (c)(1),
(2) Date: Mar. 19, 2019

(87) PCT Pub. No.: WO2018/071041
PCT Pub. Date: Apr. 19, 2018

(65) Prior Publication Data
US 2019/0228578 A1    Jul. 25, 2019

(51) Int. Cl.
*G06T 17/00* (2006.01)
*G06T 17/20* (2006.01)
(Continued)

(52) U.S. Cl.
CPC .......... *G06T 17/205* (2013.01); *B29C 64/106* (2017.08); *B29C 64/386* (2017.08); *B33Y 50/00* (2014.12); *G06T 19/20* (2013.01); *G06T 2219/2016* (2013.01); *G06T 2219/2021* (2013.01)

(58) Field of Classification Search
None
See application file for complete search history.

(56) References Cited

U.S. PATENT DOCUMENTS

| | | |
|---|---|---|
| 5,394,481 A | 2/1995 | Kumagai et al. |
| 6,249,600 B1 * | 6/2001 | Reed ...................... G06T 17/00 345/420 |

(Continued)

FOREIGN PATENT DOCUMENTS

| | | |
|---|---|---|
| CN | 103761397 A | 4/2014 |
| EA | 201071423 A1 | 6/2011 |
| WO | WO-2016029424 A1 | 3/2016 |

OTHER PUBLICATIONS

GEOSOFT Oasis montaj, "GM-SYS 3D Modelling", Geosoft Inc. http://www.geosoft.com/media/uploads/resources/brochures/extensions_montaj_gm-sys_3d_nov21-14-web.pdf [2014].

*Primary Examiner* — Anh-Tuan V Nguyen
(74) *Attorney, Agent, or Firm* — Dicke Billig & Czaja PLLC

(57) ABSTRACT

One example of a method includes receiving a three-dimensional (3D) mesh model of an object having a first mesh density. The method includes receiving a model selection for rebuilding the (3D) mesh model of the object. The method includes rebuilding the (3D) mesh model of the object based on the model selection to provide a simplified (3D) mesh model of the object having a second mesh density less than the first mesh density.

14 Claims, 7 Drawing Sheets

(51) Int. Cl.
  *B29C 64/386* (2017.01)
  *B29C 64/106* (2017.01)
  *B33Y 50/00* (2015.01)
  *G06T 19/20* (2011.01)

(56) References Cited

U.S. PATENT DOCUMENTS

| | | | |
|---|---|---|---|
| 6,505,089 B1 | 1/2003 | Yang et al. | |
| 7,173,622 B1* | 2/2007 | McLaughlin | G06T 17/10 345/420 |
| 7,233,326 B1* | 6/2007 | Silva | G06T 13/20 345/419 |
| 7,969,435 B1* | 6/2011 | DeSimone | G06T 19/20 345/420 |
| 8,369,610 B1* | 2/2013 | Korobkin | G06T 15/20 382/154 |
| 8,581,903 B2* | 11/2013 | Trotta | G06T 17/00 345/420 |
| 8,699,787 B2 | 4/2014 | Van Den Hengel et al. | |
| 9,324,188 B1 | 4/2016 | Fram et al. | |
| 2002/0003539 A1* | 1/2002 | Abe | G06T 17/205 345/428 |
| 2004/0107080 A1* | 6/2004 | Deichmann | A61F 11/08 703/6 |
| 2005/0154481 A1 | 7/2005 | Berger et al. | |
| 2005/0212811 A1* | 9/2005 | Hashima | G06T 17/20 345/582 |
| 2006/0003111 A1 | 1/2006 | Tseng | |
| 2007/0029693 A1 | 2/2007 | Wigand et al. | |
| 2007/0233298 A1 | 10/2007 | Heide et al. | |
| 2008/0150940 A1* | 6/2008 | Oyama | G06T 17/205 345/420 |
| 2008/0155451 A1* | 6/2008 | Lundstrom | G06F 19/321 715/772 |
| 2008/0166022 A1* | 7/2008 | Hildreth | G06T 7/254 382/107 |
| 2008/0218511 A1* | 9/2008 | Uchikura | G06T 17/10 345/419 |
| 2008/0303810 A1* | 12/2008 | Bae | G06F 30/00 345/419 |
| 2009/0041323 A1* | 2/2009 | Lachaine | A61B 8/483 382/131 |
| 2010/0103169 A1* | 4/2010 | Zhang | G06T 7/521 345/420 |
| 2010/0141659 A1* | 6/2010 | Bourd | G06T 11/203 345/442 |
| 2012/0069011 A1* | 3/2012 | Hurt | G06T 19/00 345/419 |
| 2012/0281001 A1* | 11/2012 | Konig | B29C 48/251 345/473 |
| 2013/0113797 A1* | 5/2013 | Mitrakis | G06T 17/05 345/420 |
| 2014/0052415 A1* | 2/2014 | Baran | G06F 30/00 703/1 |
| 2015/0084936 A1 | 3/2015 | Bae et al. | |
| 2015/0161294 A1* | 6/2015 | Mazula | G06F 30/13 703/1 |
| 2015/0178988 A1 | 6/2015 | Mora et al. | |
| 2015/0187130 A1* | 7/2015 | Guskov | G06T 17/20 345/420 |
| 2016/0015337 A1* | 1/2016 | Inoue | A61B 6/504 600/424 |
| 2016/0086376 A1* | 3/2016 | Tang | G06T 17/20 345/420 |
| 2017/0017094 A1* | 1/2017 | James | G02C 5/2254 |
| 2017/0032561 A1* | 2/2017 | Choi | G06K 15/1836 |
| 2017/0178388 A1* | 6/2017 | Bisson | G06T 17/00 |
| 2017/0189797 A1* | 7/2017 | Muthyala | A63F 13/655 |
| 2017/0278301 A1* | 9/2017 | Peterson | G06F 19/321 |
| 2018/0018830 A1* | 1/2018 | Lee | G06F 3/1205 |
| 2018/0095450 A1* | 4/2018 | Lappas | G06T 19/00 |
| 2018/0304546 A1* | 10/2018 | Hakkaku | B29C 67/00 |
| 2019/0030823 A1* | 1/2019 | Mcmurtry | B29C 64/153 |
| 2019/0210288 A1* | 7/2019 | Elber | B33Y 50/00 |

* cited by examiner

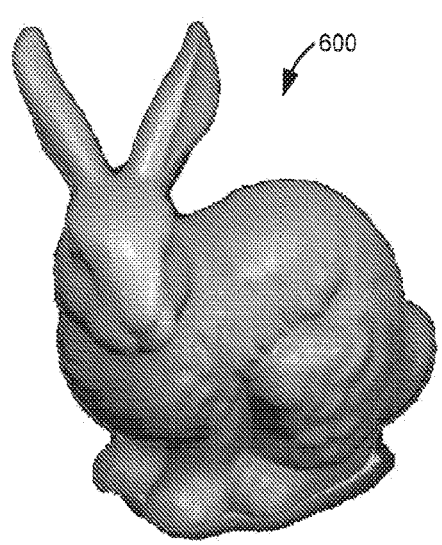
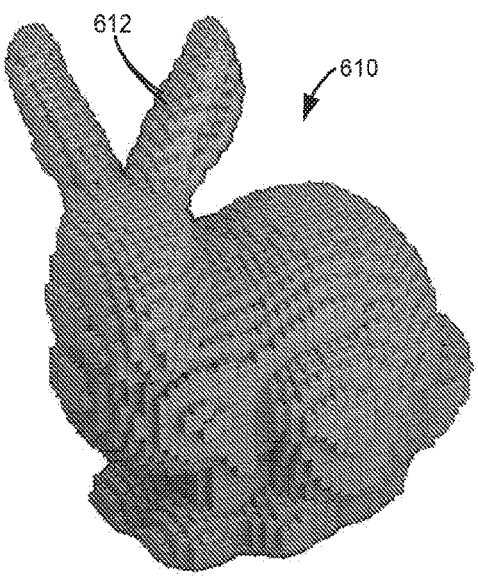
Fig. 6A                Fig. 6B
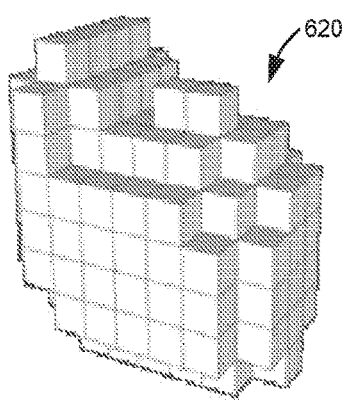
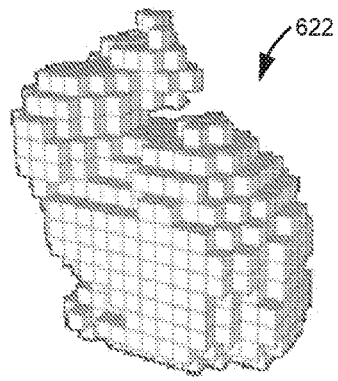
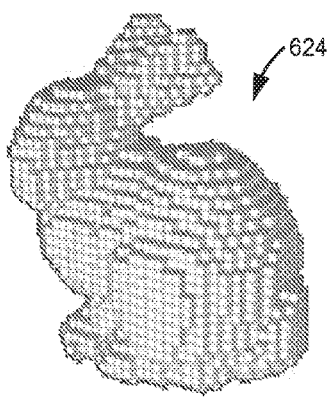
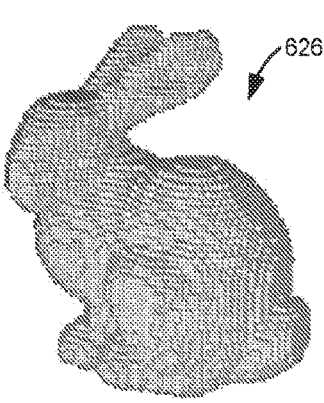
Fig. 6C

REBUILDING THREE-DIMENSIONAL MODELS TO PROVIDE SIMPLIFIED THREE-DIMENSIONAL MODELS

BACKGROUND

Three-dimensional (3D) objects may be scanned to generate a 3D model of the object that may be stored in a computer-readable storage medium. The 3D model may use a polygon mesh to define the shape of the 3D object. The polygon mesh may consist of a plurality of vertices (points in the space), edges (the connections between the vertices), and faces (a set of at least three or four edges describing a triangle or a rectangle, respectively).

BRIEF DESCRIPTION OF THE DRAWINGS

FIGS. 6A-6C illustrate one example of rebuilding a 3D mesh model of an object using a voxel model.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

When a three-dimensional (3D) object is scanned to generate a 3D mesh model of the object, the resulting mesh may be too dense to be useable. A skilled 3D artist may be needed to clean up the 3D mesh model and even to redraw parts of the object to make the 3D mesh model useable. For someone who is not skilled in 3D artistry, the chances that they could make something useful from the 3D scanned mesh model is unlikely.

Accordingly, a system and method to rebuild the scanned 3D mesh model of the object to provide a simplified 3D mesh model of the object that may be efficiently modified is disclosed herein. The scanned 3D mesh model may be rebuilt based on a lathe model, a loft model, an extrusion module, or a voxel model. The process to rebuild the scanned 3D mesh model varies depending on the selected model. In any case, however, the rebuilt 3D mesh model of the object has a lower mesh density than the scanned 3D mesh model. Accordingly, by using the system or method described herein, any user, regardless of their expertise in 3D technologies may scan a 3D object and generate a rebuilt 3D mesh model of the object that may be modified to create their own unique models. The rebuilt 3D mesh models also simplify 3D printing of the objects.

Figure 1:
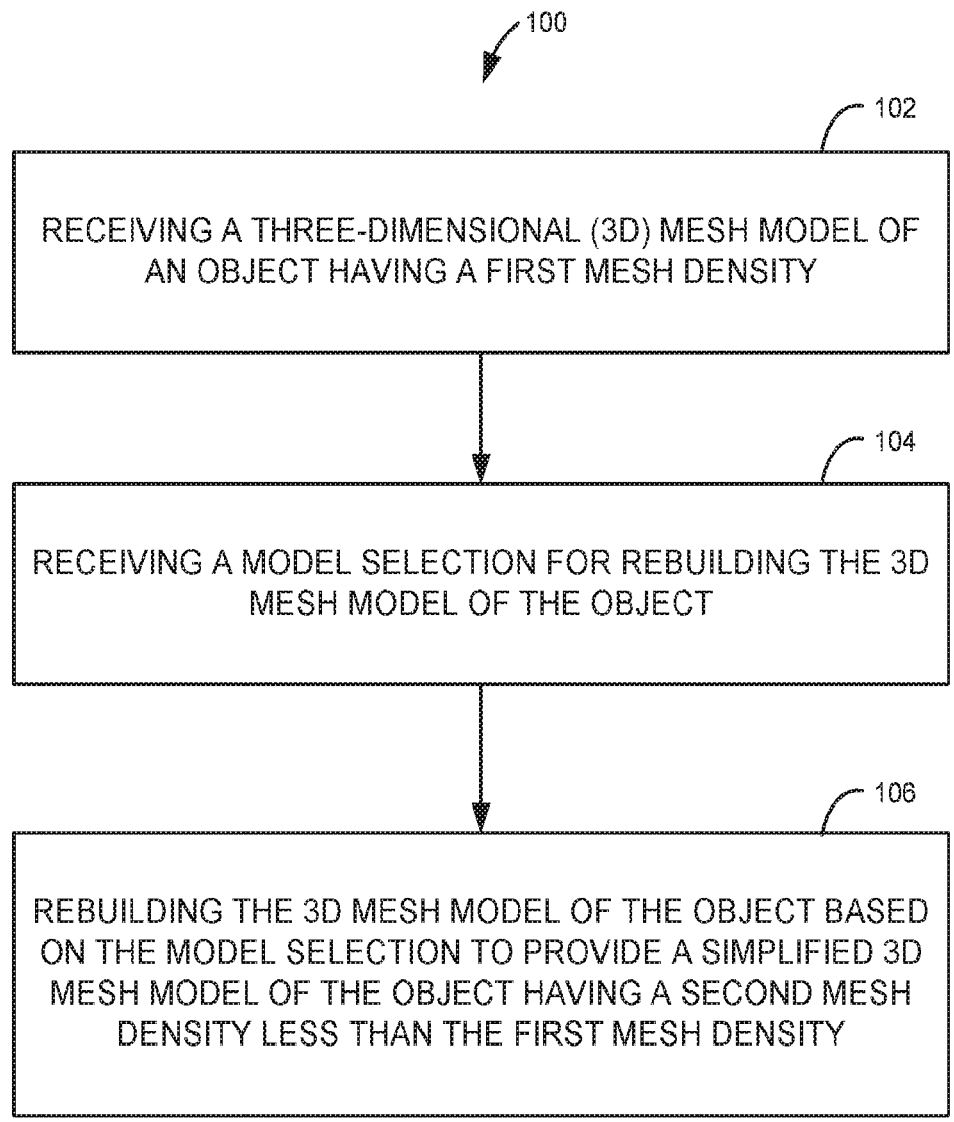
FIG. 1 is a flow diagram illustrating one example of a method for rebuilding a three-dimensional (3D) mesh model of an object.

FIG. 1 is a flow diagram illustrating one example of a method 100 for rebuilding a 3D mesh model of an object. In one example, method 100 is implemented via a processor, such as processor 202, which will be described with reference to FIG. 2. At 102, method 100 includes receiving a 3D mesh model of an object having a first mesh density. In one example, the 3D mesh model is a scanned 3D mesh model of an object. At 104, method 100 includes receiving a model selection for rebuilding the 3D mesh model of the object. In one example, receiving the model selection includes receiving any one of a lathe model selection, a loft model selection, an extrusion model selection, and a voxel model selection for rebuilding the 3D mesh model of the object. At 106, method 100 includes rebuilding the 3D mesh model of the object based on the model selection to provide a simplified 3D mesh model of the object having a second mesh density less than the first mesh density. In one example, method 100 also includes modifying at least one of a width parameter, a depth parameter, a height parameter, a radius parameter, and a size parameter of the simplified 3D mesh model of the object. In this way, a user may scan an object to generate a 3D model, rebuild the 3D model to provide a simplified 3D model, and modify the simplified 3D model to create a new 3D model.

Figure 2:
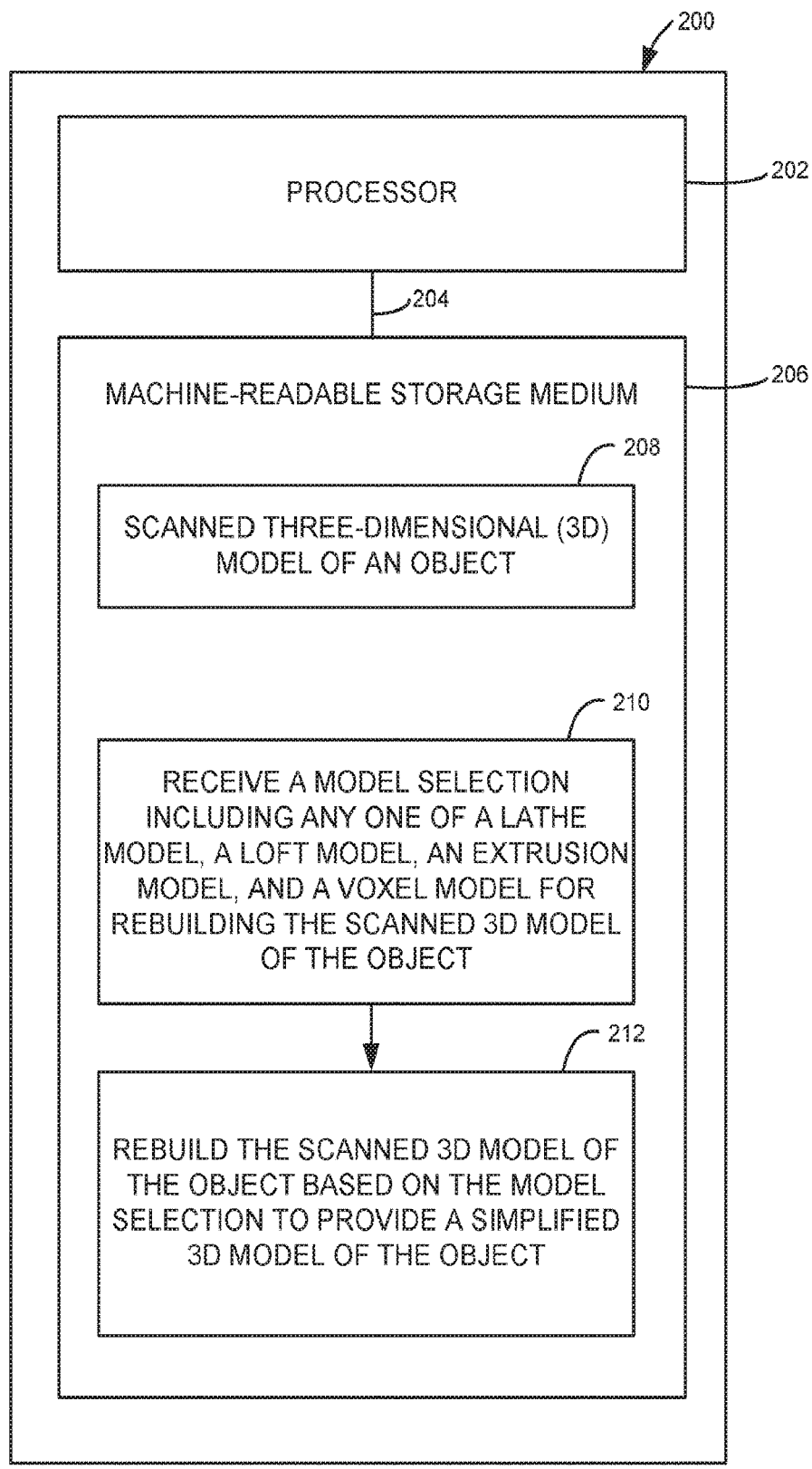
FIG. 2 is a block diagram illustrating one example of a processing system for rebuilding a 3D mesh model of an object.

FIG. 2 is a block diagram illustrating one example of a processing system 200 for rebuilding a 3D mesh model of an object. System 200 includes a processor 202 and a machine-readable storage medium 206. Processor 202 is communicatively coupled to machine-readable storage medium 206 through a communication path 204. Although the following description refers to a single processor and a single machine-readable storage medium, the description may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 202 includes one or more central processing units (CPUs), microprocessors, and/or other suitable hardware devices for retrieval and execution of instructions stored in machine-readable storage medium 206. Machine-readable storage medium 206 may store data 208 including a scanned 3D model of an object. Processor 202 may fetch, decode, and execute instructions 210-212 to rebuild the scanned 3D model of the object. Processor 202 may fetch, decode, and execute instructions 210 to receive a model selection including any one of a lathe model, a loft model, an extrusion model, and a voxel model for rebuilding the scanned 3D model of the object. In one example, the model selection may be received from a user through a user interface. Processor 202 may fetch, decode, and execute instructions 212 to rebuild the scanned 3D model of the object based on the model selection to provide a simplified 3D model of the object.

In one example, processor 202 may execute instructions 212 to rebuild the scanned 3D model of the object based on the lathe model selection. Rebuilding using the lathe model includes determining a construction axis of the scanned 3D model of the object and slicing the scanned 3D model of the object through the construction axis to isolate a two-dimensional (2D) profile of the object. In this example, rebuilding using the lathe model also includes slicing the 2D profile along the construction axis to obtain a construction lathe shape and copying and connecting the construction lathe shape at a predefined angular construction spacing around the construction axis to provide the simplified 3D model of the object.

In another example, processor 202 may execute instructions 212 to rebuild the scanned 3D model of the object based on the lathe model selection by further slicing the scanned 3D model of the object a plurality of times at a predefined angular slicing spacing through the construction axis to isolate a corresponding plurality of 2D profiles of the object. In this example, rebuilding using the lathe model also includes slicing each 2D profile along the construction axis to obtain a plurality of corresponding lathe shapes and averaging the plurality of lathe shapes to provide the construction lathe shape.

In another example, processor 202 may execute instructions 212 to rebuild the scanned 3D model of the object based on the loft model selection. Rebuilding using the loft model includes determining a construction axis of the scanned 3D model of the object and slicing the scanned 3D model of the object perpendicular to the construction axis at predefined intervals to provide a plurality of 2D shapes. In this example, rebuilding using the loft model also includes connecting the plurality of 2D shapes along the construction axis to provide the simplified 3D model of the object. In another example, rebuilding using the loft model may include discarding redundant 2D shapes from the plurality of 2D shapes prior to connecting the plurality of 2D shapes to provide the simplified 3D model of the object.

In another example, processor 202 may execute instructions 212 to rebuild the scanned 3D model of the object based on the extrusion model. Rebuilding using the extrusion model includes determining a construction axis of the scanned 3D model of the object and slicing the scanned 3D model of the object perpendicular to the construction axis at predefined slicing intervals to provide a plurality of 2D shapes. In this example, rebuilding using the extrusion model also includes averaging the plurality of 2D shapes to provide a construction extrusion shape and copying and connecting the construction extrusion shape at predefined construction intervals along the construction axis to provide the simplified 3D model of the object.

In another example, processor 202 may execute instructions 212 to rebuild the scanned 3D model of the object based on the voxel model selection. Rebuilding using the voxel model includes receiving a voxelization density and dividing the scanned 3D model of the object into a plurality of adjacent blocks based on the voxelization density to provide the simplified 3D model of the object.

As an alternative or in addition to retrieving and executing instructions, processor 202 may include one or more electronic circuits comprising a number of electronic components for performing the functionality of one or more of the instructions in machine-readable storage medium 206. With respect to the executable instruction representations (e.g., boxes) described and illustrated herein, it should be understood that part or all of the executable instructions and/or electronic circuits included within one box may, in alternate examples, be included in a different box illustrated in the figures or in a different box not shown.

Machine-readable storage medium 206 is a non-transitory storage medium and may be any suitable electronic, magnetic, optical, or other physical storage device that stores executable instructions. Thus, machine-readable storage medium 206 may be, for example, random access memory (RAM), an electrically-erasable programmable read-only memory (EEPROM), a storage drive, an optical disc, and the like. Machine-readable storage medium 206 may be disposed within system 200, as illustrated in FIG. 2. In this case, the executable instructions may be installed on system 200. Alternatively, machine-readable storage medium 206 may be a portable, external, or remote storage medium that allows system 200 to download the instructions from the portable/external/remote storage medium. In this case, the executable instructions may be part of an installation package.

Figure 3A:
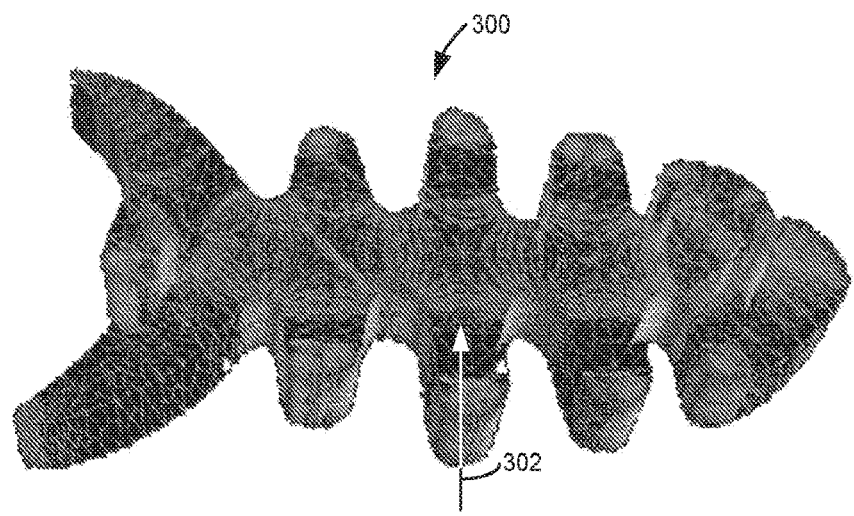
FIGS. 3A-3C illustrate one example of rebuilding a 3D mesh model of an object using an extrusion model.
Figure 3B:
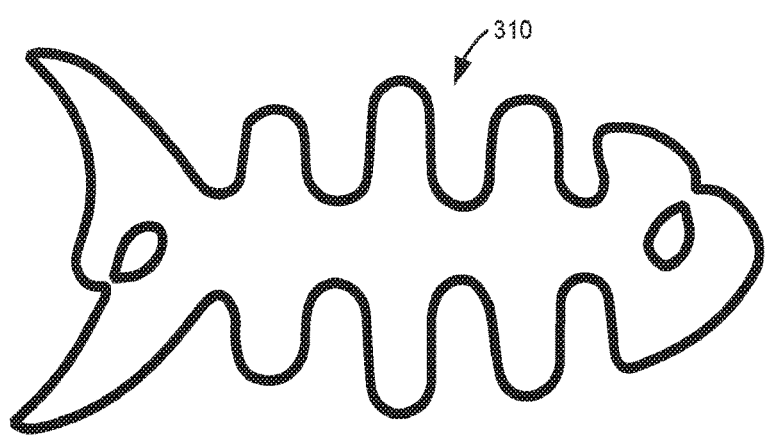
Figure 3C:
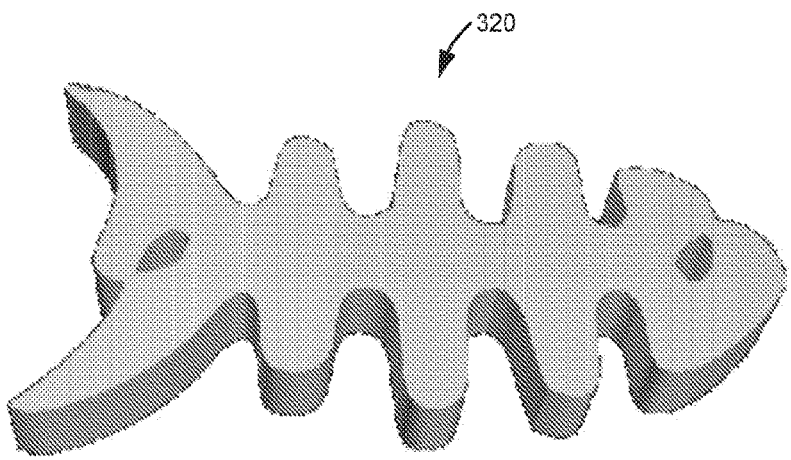

FIGS. 3A-3C illustrate one example of rebuilding a 3D mesh model of an object using an extrusion model. FIG. 3A illustrates one example of a scanned 3D mesh model 300 of an object. The construction axis of the scanned 3D model 300 is indicated at 302. In one example, the construction axis is determined based on a user selection. In another example, the construction axis is determined by a mathematical analysis of 3D mesh model 300 to determine which axis of the 3D mesh model is suitable for use as the construction axis. The 3D mesh model 300 is then sliced at predefined slicing intervals in the direction perpendicular to construction axis 302 to provide a plurality of slices (i.e., 2D shapes).

FIG. 3B illustrates one example of a construction extrusion shape 310. Construction extrusion shape 310 is a 2D shape generated by combining (e.g., overlapping) the plurality of slices to obtain a single representative shape with reduced noise. In one example, construction extrusion shape 310 is obtained by averaging the plurality of slices to provide the single representative shape.

FIG. 3C illustrates one example of a rebuilt 3D mesh model 320 based on the construction extrusion shape 310. Construction extrusion shape 310 is copied and connected at predefined construction intervals along construction axis 302 to provide the simplified 3D mesh model 320 of the object.

Figure 4D:
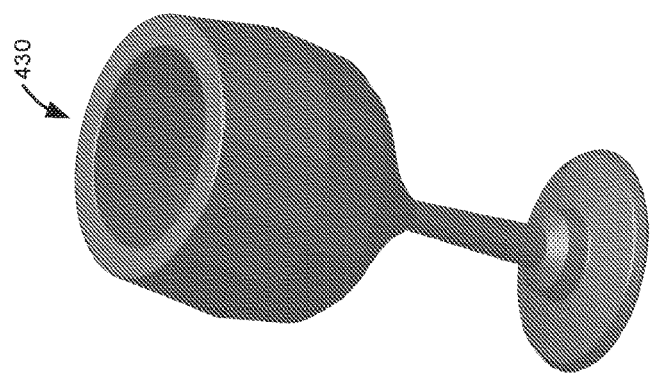
FIGS. 4A-4D illustrate one example of rebuilding a 3D mesh model of an object using a lathe model.
Figure 4C:
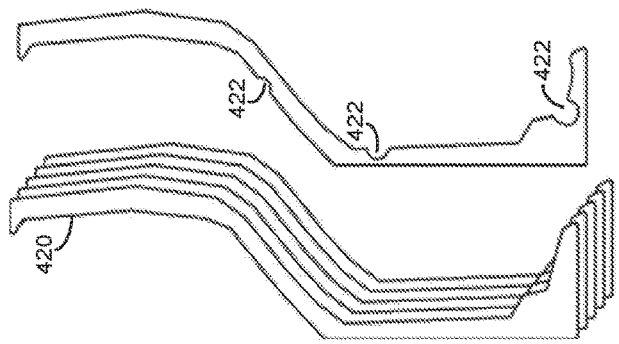
Figure 4B:
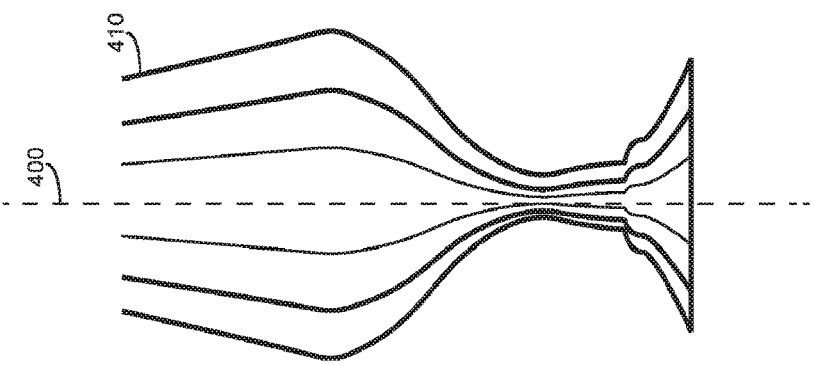
Figure 4A:
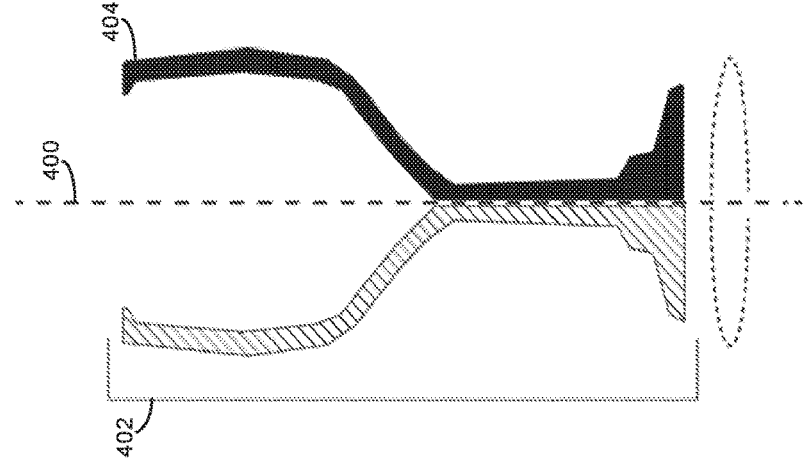

FIGS. 4A-4D illustrate one example of rebuilding a 3D mesh model of an object using a lathe model. FIG. 4A illustrates one example of determining a construction axis and a 2D profile of a 3D mesh model. The construction axis is indicated at 400. In one example, construction axis 400 may be determined based on a user selection. In another example, construction axis 400 may be determined by a mathematical analysis (e.g., using techniques such as principal component analysis eigenvectors, cross-products, mean squared error) of the 3D mesh model to determine which axis of the 3D mesh model is suitable for use as the construction axis. The 3D mesh model is then sliced though construction axis 400 to isolate a 2D profile 402 of the object. The 2D profile 402 is then sliced along construction axis 400 to obtain a construction lathe shape 404.

FIG. 4B illustrates one example of slicing the 3D model a plurality of times at a predefined angular slicing spacing (e.g., 15 degrees) through construction axis 400 to isolate a corresponding plurality of 2D profiles of the object and slicing each 2D profile along the construction axis to obtain a plurality of corresponding lathe shapes, one of which is indicated for example at 410.

FIG. 4C illustrates one example of overlapping the plurality of lathe shapes as indicated at 420 to obtain a single representative construction lathe shape. In one example, if a lathe shape of the plurality of lathe shapes varies beyond a predetermined threshold from the majority of lathe shapes as indicated for example by a lathe shape having areas 422, the lathe shape is excluded from the plurality of lathe shapes used to obtain the single representative construction lathe shape. In one example, the plurality of lathe shapes are averaged to provide the construction lathe shape. The construction lathe shape may be further simplified by analyzing the lines of the construction lathe shape and removing any points between the endpoints of each straight line within the construction lathe shape.

FIG. 4D illustrates one example of the rebuilt 3D mesh model 430 of the object. The simplified 3D mesh model 430 is created by copying and connecting the construction lathe shape at a predefined angular construction spacing around construction axis 400.

Figure 5A:
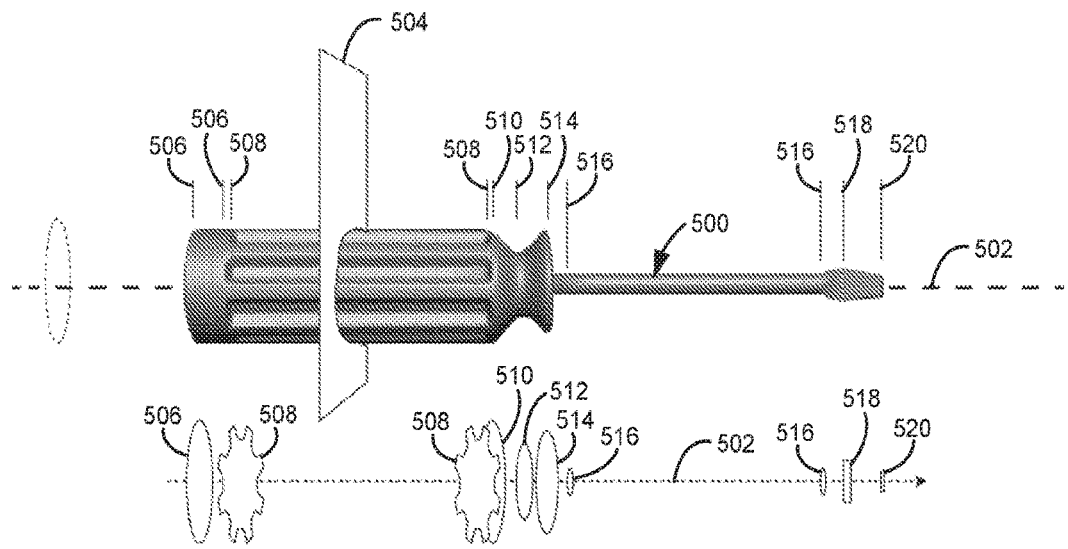
FIGS. 5A-5C illustrate one example of rebuilding a 3D mesh model of an object using a loft model.
Figure 5B:
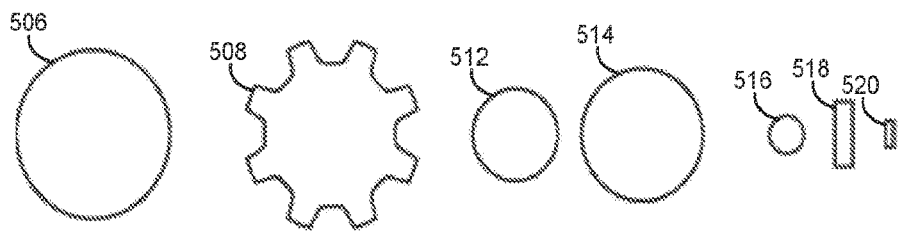
Figure 5B:
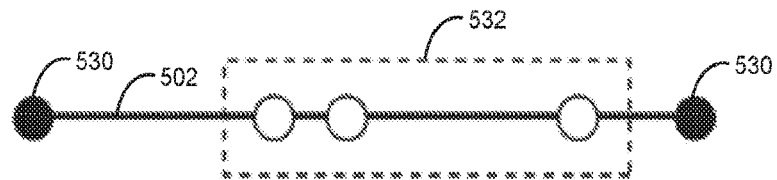
Figure 5C:
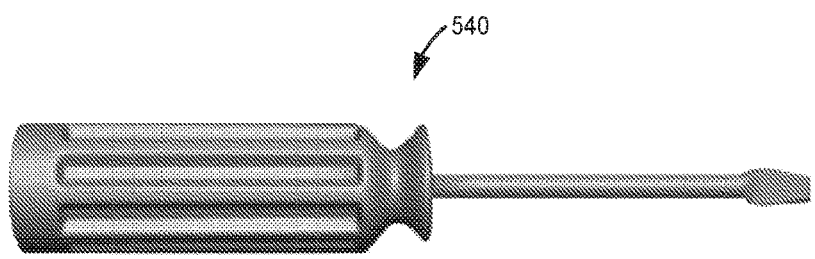

FIGS. 5A-5C illustrate one example of rebuilding a 3D mesh model 500 of an object using a loft model. FIG. 5A illustrates one example of determining a construction axis and 2D shapes of 3D mesh model 500. The construction axis is indicated at 502. In one example, construction axis 502 may be determined based on a user selection. In another example, construction axis 502 may be determined by a mathematical analysis (e.g., using techniques such as principal component analysis eigenvectors, cross-products, mean squared error) of the 3D mesh model to determine which axis of the 3D mesh model is suitable for use as the construction axis.

The 3D mesh model 500 is then sliced perpendicular to construction axis 502, as indicated for example at 504, at predefined intervals to provide a plurality of 2D shapes 506-520. As 3D mesh model 500 is sliced from left to right, a first 2D shape (i.e., a round shape) is identified as indicated at 506, a second 2D shape (i.e., a gear shape) is identified as indicated at 508, a third 2D shape (i.e., a round shape) is identified as indicated at 510, a fourth 2D shape (i.e., a round shape) is identified as indicated at 512, a fifth shape (i.e., a round shape) is identified as indicated at 514, a sixth shape (i.e., a round shape) is identified as indicated at 516, a seventh shape (i.e., a rectangular shape) is identified as indicated at 518, and an eighth shape (i.e., a rectangular shape) is identified as indicated at 520. In this example, the first 2D shape 506 and the third 2D shape 510 are the same shape.

FIG. 5B illustrates one example of a single representation of each 2D shape 506, 508, 512, 514, 516, 518, and 520. For each 2D shape, redundant 2D shapes from the plurality of 2D shapes are discarded as indicated at 532 such that only the endpoint 2D shapes as indicated at 530 are maintained. Thus, each portion of the object may be defined by a single shape and a distance between the endpoints for the shape. FIG. 5C illustrates one example of a rebuilt 3D mesh model 540. The 3D mesh model 540 is built by copying and connecting the plurality of the 2D shapes (i.e., 506, 508, 510, 512, 514, 516, 518, and 520), respectively, along construction axis 502 to provide the simplified 3D model of the object. In this way, each section of 3D mesh model 540 having a different shape is built similarly to a single shaped object using the extrusion model.

FIGS. 6A-6C illustrate one example of rebuilding a 3D mesh model of an object using a voxel model. FIG. 6A illustrates one example of a scanned 3D mesh model 600. FIG. 6B illustrates one example of a rebuilt 3D model 610 using the voxel model. The 3D model 610 is generated by dividing scanned 3D mesh model 600 into a plurality of adjacent blocks (e.g., cubes, cuboids, interlocking bricks), indicated for example at 612, to provide the simplified 3D model of the object. FIG. 6C illustrates example rebuilt 3D models 620-626 having different voxelization densities. The 3D model 620 has a first voxelization density, 3D model 622 has a second voxelization density, 3D model 624 has a third voxelization density, and 3D model 626 has a fourth voxelization density. The voxelization density increases from the first voxelization density to the fourth voxelization density. As the voxelization density is increased, the size of each block is reduced and the amount of detail maintained from the scanned 3D mesh model 600 is increased.

More than one model selection may be used to rebuild a 3D model of an object to provide a simplified 3D model of the object. In one example, a 3D model of an object may be rebuilt based on the lathe model followed by rebuilding based on the voxel model to provide a simplified 3D model of the object. In another example, a 3D model of the object may be rebuilt based on the loft model followed by rebuilding based on the voxel model to provide a simplified 3D model of the object. In yet another example, a 3D model of the object may be rebuilt based on the extrusion model followed by rebuilding based on the voxel model to provide a simplified 3D model of the object.

Figure 7:
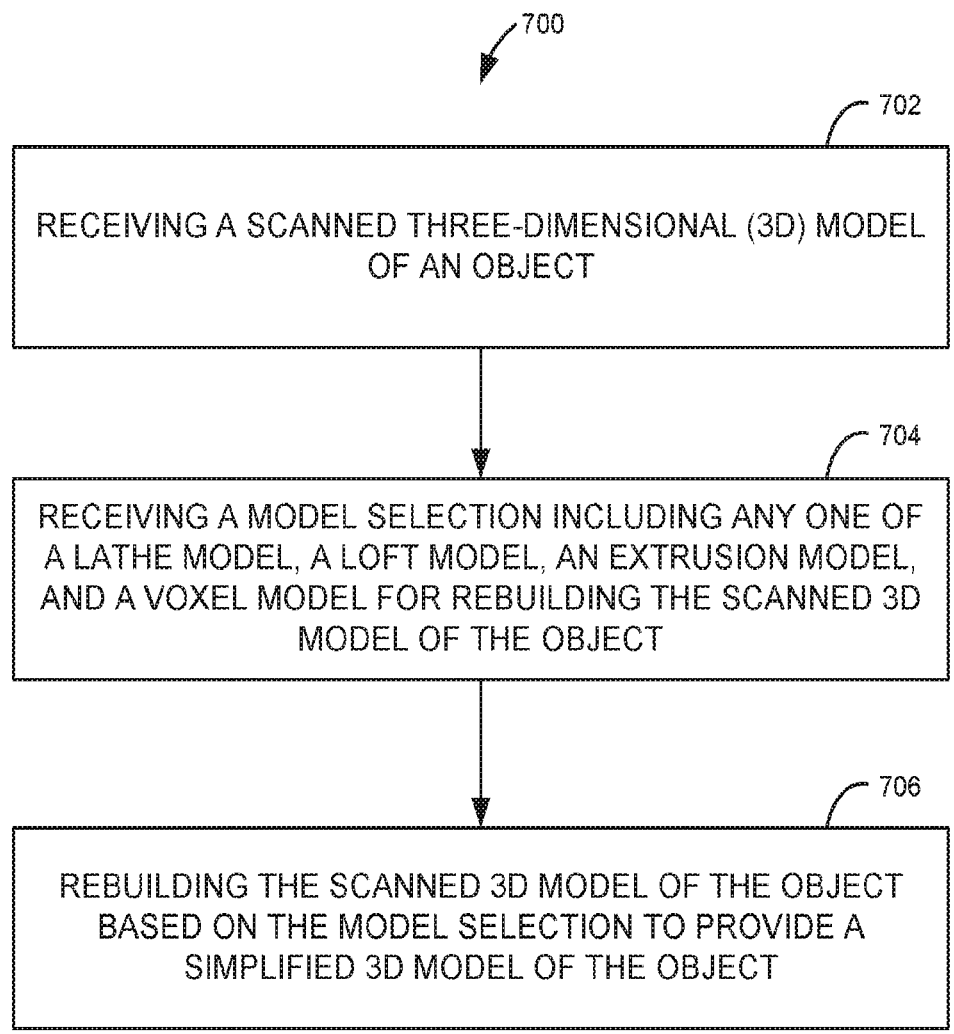
FIG. 7 is a flow diagram illustrating another example of a method for rebuilding a 3D mesh model of an object.

FIG. 7 is a flow diagram illustrating another example of a method 700 for rebuilding a 3D mesh model of an object. In one example, method 700 is implemented via a processor, such as processor 202 previously described and illustrated with reference to FIG. 2. At 702, method 700 includes receiving a scanned 3D model of an object. At 704, method 700 includes receiving a model selection including any one of a lathe model, a loft model, an extrusion model, and a voxel model for rebuilding the scanned 3D model of the object. At 706, method 700 includes rebuilding the scanned 3D model of the object based on the model selection to provide a simplified 3D model of the object.

In one example, rebuilding the scanned 3D model of the object based on the lathe model to provide the simplified 3D model of the object includes determining a construction axis of the scanned 3D model of the object. The method further includes slicing the scanned 3D model of the object through the construction axis at predefined angular slice intervals to isolate a plurality of 2D profiles of the object. The method also includes slicing each 2D profile along the construction axis to obtain a plurality of corresponding lathe shapes and combining the plurality of lathe shapes to provide a construction lathe shape. In addition, the method includes copying and connecting the construction lathe shape at predefined angular construction intervals around the construction axis to provide the simplified 3D model of the object.

In another example, rebuilding the scanned 3D model of the object based on the loft model to provide the simplified 3D model of the object includes determining a construction axis of the scanned 3D model of the object. The method further includes slicing the scanned 3D model of the object perpendicular to the construction axis at predefined intervals to provide a plurality of 2D shapes. The method also includes identifying 2D shapes of the plurality of 2D shapes that differ from adjacent 2D shapes and discarding 2D shapes from the plurality of 2D shapes that are not identified as differing from adjacent 2D shapes. In addition, the method includes connecting the remaining 2D shapes along the construction axis to provide the simplified 3D model of the object.

In another example, rebuilding the scanned 3D model of the object based on the extrusion model to provide the simplified 3D model of the object includes determining a construction axis of the scanned 3D model of the object. The method further includes slicing the scanned 3D model of the object perpendicular to the construction axis at predefined slicing intervals to provide a plurality of 2D shapes. The method also includes combining the plurality of 2D shapes to provide a 2D extrusion shape. In addition, the method includes copying and connecting the 2D extrusion shape at predefined construction intervals along the construction axis to provide the simplified 3D model of the object.

In another example, rebuilding the scanned 3D model of the object based on the voxel model to provide the simplified 3D model of the object includes receiving a number of cubes to represent the scanned 3D model of the object. The method further includes dividing the scanned 3D model of the object into a plurality of adjacent cubes equal to the received number to provide the simplified 3D model of the object.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A system comprising:
a machine-readable storage medium storing instructions and a scanned three-dimensional (3D) model of an object; and
a processor to execute the instructions to:
receive a model selection selected from a group comprising a lathe model selection, a loft model selection, and an extrusion model selection for rebuilding the scanned 3D model of the object; and
completely rebuild the scanned 3D model of the object based on the model selection to provide a simplified 3D model of the object,
wherein the processor is to execute the instructions to rebuild the scanned 3D model of the object by:
selecting a two-dimensional (2D) shape based on the scanned 3D model of the object and the selected one of the lathe model selection, the loft model selection, and the extrusion model selection;
reducing the complexity of the 2D shape based on the selected one of the lathe model selection, the loft model selection, and the extrusion model selection; and
generating the simplified 3D model of the object based on the 2D shape of reduced complexity and the selected one of the lathe model selection, the loft model selection, and the extrusion model selection;
wherein the processor is to execute the instructions to rebuild the scanned 3D model of the object based on the lathe model selection by:
determining a construction axis of the scanned 3D model of the object;
slicing the scanned 3D model of the object through the construction axis to isolate a two-dimensional (2D) profile of the object;
slicing the 2D profile along the construction axis to obtain a construction lathe shape; and
copying and connecting the construction lathe shape at a predefined angular construction spacing around the construction axis to provide the simplified 3D model of the object; and
wherein the processor is to execute the instructions to rebuild the scanned 3D model of the object based on the lathe model selection by further:
slicing the scanned 3D model of the object a plurality of times at a predefined angular slicing spacing through the construction axis to isolate a corresponding plurality of 2D profiles of the object;
slicing each 2D profile along the construction axis to obtain a plurality of corresponding lathe shapes; and
averaging the plurality of lathe shapes to provide the construction lathe shape.

2. The system of claim 1, wherein the processor is to execute the instructions to rebuild the scanned 3D model of the object based on the loft model selection by:
determining a construction axis of the scanned 3D model of the object;
slicing the scanned 3D model of the object perpendicular to the construction axis at predefined intervals to provide a plurality of two-dimensional (2D) shapes; and
connecting the plurality of 2D shapes along the construction axis to provide the simplified 3D model of the object.

3. The system of claim 2, wherein the processor is to execute the instructions to rebuild the scanned 3D model of the object based on the loft model selection by further:
discarding redundant 2D shapes from the plurality of 2D shapes prior to connecting the plurality of 2D shapes to provide the simplified 3D model of the object.

4. The method of claim 1, wherein the simplified 3D model is independent of the scanned 3D model of the object.

5. The system of claim 1, wherein the processor is to execute the instructions to rebuild the scanned 3D model of the object based on the lathe model selection by further:
simplifying the construction lathe shape by analyzing lines of the construction lathe shape and removing any points between endpoints of each straight line within the construction lathe shape.

6. A system comprising:
a machine-readable storage medium storing instructions and a scanned three-dimensional (3D) model of an object; and
a processor to execute the instructions to:
receive a model selection selected from a group comprising a lathe model selection, a loft model selection, and an extrusion model selection for rebuilding the scanned 3D model of the object; and
completely rebuild the scanned 3D model of the object based on the model selection to provide a simplified 3D model of the object,
wherein the processor is to execute the instructions to rebuild the scanned 3D model of the object by:
selecting a two-dimensional (2D) shape based on the scanned 3D model of the object and the selected one of the lathe model selection, the loft model selection, and the extrusion model selection;
reducing the complexity of the 2D shape based on the selected one of the lathe model selection, the loft model selection, and the extrusion model selection; and
generating the simplified 3D model of the object based on the 2D shape of reduced complexity and the selected one of the lathe model selection, the loft model selection, and the extrusion model selection; and
wherein the processor is to execute the instructions to rebuild the scanned 3D model of the object based on the extrusion model selection by:
determining a construction axis of the scanned 3D model of the object;
slicing the scanned 3D model of the object perpendicular to the construction axis at predefined slicing intervals to provide a plurality of two-dimensional (2D) shapes;

averaging the plurality of 2D shapes to provide a construction extrusion shape; and copying and connecting the construction extrusion shape at predefined construction intervals along the construction axis to provide the simplified 3D model of the object.

7. A method comprising:

receiving, via a processor, a scanned three-dimensional (3D) model of an object;

receiving, via the processor, a model selection selected from a group comprising a lathe model selection, a loft model selection, and an extrusion model selection for rebuilding the scanned 3D model of the object; and completely rebuilding, via the processor, the scanned 3D model of the object based on the model selection to provide a simplified 3D model of the object, wherein the rebuilding comprises:

selecting a two-dimensional (2D) shape based on the scanned 3D model of the object and the selected one of the lathe model selection, the loft model selection, and the extrusion model selection;

reducing the complexity of the 2D shape based on the selected one of the lathe model selection, the loft model selection, and the extrusion model selection; and generating the simplified 3D model of the object based on the 2D shape of reduced complexity and the selected one of the lathe model selection, the loft model selection, and the extrusion model selection; and wherein rebuilding the scanned 3D model of the object based on the lathe model to provide the simplified 3D model of the object comprises:

determining a construction axis of the scanned 3D model of the object;

slicing the scanned 3D model of the object through the construction axis at predefined angular slice intervals to isolate a plurality of two-dimensional (2D) profiles of the object;

slicing each 2D profile along the construction axis to obtain a plurality of corresponding lathe shapes;

combining the plurality of lathe shapes to provide a construction lathe shape; and copying and connecting the construction lathe shape at predefined angular construction intervals around the construction axis to provide the simplified 3D model of the object.

8. The method of claim 7, wherein rebuilding the scanned 3D model of the object based on the loft model to provide the simplified 3D model of the object comprises:

determining a construction axis of the scanned 3D model of the object;

slicing the scanned 3D model of the object perpendicular to the construction axis at predefined intervals to provide a plurality of two-dimensional (2D) shapes;

identifying 2D shapes of the plurality of 2D shapes that differ from adjacent 2D shapes;

discarding 2D shapes from the plurality of 2D shapes that are not identified as differing from adjacent 2D shapes; and connecting the remaining 2D shapes along the construction axis to provide the simplified 3D model of the object.

9. The method of claim 7, wherein the simplified 3D model is independent of the scanned 3D model of the object.

10. The method of claim 7, wherein rebuilding the scanned 3D model of the object based on the lathe model to provide the simplified 3D model of the object further comprises:

simplifying the construction lathe shape by analyzing lines of the construction lathe shape and removing any points between endpoints of each straight line within the construction lathe shape.

11. A method comprising:

receiving, via a processor, a scanned three-dimensional (3D) model of an object;

receiving, via the processor, a model selection selected from a group comprising a lathe model selection, a loft model selection, and an extrusion model selection for rebuilding the scanned 3D model of the object; and completely rebuilding, via the processor, the scanned 3D model of the object based on the model selection to provide a simplified 3D model of the object, wherein the rebuilding comprises:

selecting a two-dimensional (2D) shape based on the scanned 3D model of the object and the selected one of the lathe model selection, the loft model selection, and the extrusion model selection;

reducing the complexity of the 2D shape based on the selected one of the lathe model selection, the loft model selection, and the extrusion model selection; and generating the simplified 3D model of the object based on the 2D shape of reduced complexity and the selected one of the lathe model selection, the loft model selection, and the extrusion model selection; and wherein rebuilding the scanned 3D model of the object based on the extrusion model to provide the simplified 3D model of the object comprises:

determining a construction axis of the scanned 3D model of the object;

slicing the scanned 3D model of the object perpendicular to the construction axis at predefined slicing intervals to provide a plurality of two-dimensional (2D) shapes;

combining the plurality of 2D shapes to provide a 2D extrusion shape; and copying and connecting the 2D extrusion shape at predefined construction intervals along the construction axis to provide the simplified 3D model of the object.

12. A method comprising:

receiving, via a processor, a three-dimensional (3D) mesh model of an object having a first mesh density;

receiving, via the processor, a model selection selected from a group comprising a lathe model selection, a loft model selection, and an extrusion model selection for rebuilding the 3D mesh model of the object; and completely rebuilding, via the processor, the 3D mesh model of the object based on the model selection to provide a simplified 3D mesh model of the object having a second mesh density less than the first mesh density, wherein the rebuilding comprises:

selecting a two-dimensional (2D) shape based on the 3D mesh model of the object and the selected one of the lathe model selection, the loft model selection, and the extrusion model selection;

reducing the complexity of the 2D shape based on the selected one of the lathe model selection, the loft model selection, and the extrusion model selection; and generating the simplified 3D mesh model of the object based on the 2D shape of reduced complexity and the selected one of the lathe model selection, the loft model selection, and the extrusion model selection; and wherein rebuilding the 3D mesh model of the object based on the lathe model to provide the simplified 3D mesh model of the object comprises:

determining a construction axis of the 3D mesh model of the object;

slicing the 3D mesh model of the object through the construction axis at predefined angular slice intervals to isolate a plurality of two-dimensional (2D) profiles of the object;

slicing each 2D profile along the construction axis to obtain a plurality of corresponding lathe shapes;

combining the plurality of lathe shapes to provide a construction lathe shape;

analyzing lines of the construction lathe shape and removing any points between endpoints of each straight line within the construction lathe shape to provide a simplified construction lathe shape; and copying and connecting the simplified construction lathe shape at predefined angular construction intervals around the construction axis to provide the simplified 3D mesh model of the object.

13. The method of claim 12, further comprising:

modifying at least one of a width parameter, a depth parameter, a height parameter, a radius parameter, and a size parameter of the simplified 3D mesh model of the object.

14. The method of claim 12, wherein the simplified 3D mesh model is independent of the 3D mesh model of the object.

* * * * *